(12) United States Patent
Bernard

(10) Patent No.: US 11,396,370 B2
(45) Date of Patent: Jul. 26, 2022

(54) COAXIAL ROTOR SYSTEMS FOR VTOL AIRCRAFT

(71) Applicant: Textron Innovations Inc., Providence, RI (US)

(72) Inventor: Guy Bernard, Kirkland (CA)

(73) Assignee: Textron Innovations Inc., Providence, RI (US)

( * ) Notice: Subject to any disclaimer, the term of this patent is extended or adjusted under 35 U.S.C. 154(b) by 371 days.

(21) Appl. No.: 16/824,647

(22) Filed: Mar. 19, 2020

(65) Prior Publication Data
US 2021/0291971 A1    Sep. 23, 2021

(51) Int. Cl.
| | |
|---|---|
| B64C 27/10 | (2006.01) |
| B64C 27/52 | (2006.01) |
| B64C 27/80 | (2006.01) |
| B64C 13/24 | (2006.01) |
| B64C 9/00 | (2006.01) |
| B64C 5/06 | (2006.01) |
| B64C 29/00 | (2006.01) |

(52) U.S. Cl.
CPC .............. B64C 27/10 (2013.01); B64C 5/06 (2013.01); B64C 9/00 (2013.01); B64C 13/24 (2013.01); B64C 27/52 (2013.01); B64C 27/80 (2013.01); B64C 29/0033 (2013.01)

(58) Field of Classification Search
CPC ......... B64C 27/10; B64C 27/52; B64C 27/80; B64C 29/0033; B64C 5/10; B64C 2027/8263; B64C 2027/8272
See application file for complete search history.

(56) References Cited

U.S. PATENT DOCUMENTS

| | | | | |
|---|---|---|---|---|
| 2,461,348 A | * | 2/1949 | Pentecost | B64C 39/026 416/129 |
| 3,118,504 A | * | 1/1964 | Cresap | B64C 27/52 416/102 |
| 3,690,607 A | * | 9/1972 | Mard | B64C 27/001 248/550 |
| 4,462,559 A | * | 7/1984 | Garza | B64C 27/82 244/17.19 |

(Continued)

FOREIGN PATENT DOCUMENTS

| | | |
|---|---|---|
| DE | 19647948 A1 † | 7/1997 |
| DE | 102011053787 A1 * | 3/2013 ............... B63H 1/14 |

(Continued)

OTHER PUBLICATIONS

Appendix document for U.S. Appl. No. 16/741,770, 16741770,Appendix_to_the_specification,2020-01-14.*

(Continued)

*Primary Examiner* — Philip J Bonzell
(74) *Attorney, Agent, or Firm* — Lawrence Youst LLC

(57) ABSTRACT

A coaxial rotor system for a rotorcraft includes a mast, a top rotor assembly and a bottom rotor assembly. The top rotor assembly is coupled to the distal end of the mast. The bottom rotor assembly includes a motor configured to provide rotational energy to the mast, thereby rotating the top rotor assembly. The bottom rotor assembly experiences a torque reaction force responsive to the motor rotating the mast such that the top and bottom rotor assemblies counter rotate.

17 Claims, 12 Drawing Sheets

(56) References Cited

U.S. PATENT DOCUMENTS

| | | | | |
|---|---|---|---|---|
| 8,556,207 | B2* | 10/2013 | Cilli | B64C 27/10 244/17.23 |
| 8,807,476 | B2* | 8/2014 | Raffel | B64C 39/029 244/17.11 |
| 9,199,729 | B1* | 12/2015 | Uebori | B64C 27/605 |
| 9,248,909 | B2* | 2/2016 | Eller | B64C 27/80 |
| 10,150,567 | B2* | 12/2018 | Lauder | B64C 27/10 |
| 10,407,166 | B2* | 9/2019 | Lauder | B64D 31/06 |
| 10,676,182 | B2* | 6/2020 | Lauder | B64C 27/35 |
| 11,053,002 | B2† | 7/2021 | McBain | |
| 11,111,030 | B2* | 9/2021 | Thrun | B64D 27/24 |
| 2013/0149151 | A1* | 6/2013 | Rauber | B64C 27/43 416/131 |
| 2015/0028597 | A1* | 1/2015 | Eller | B64C 27/72 290/1 A |
| 2015/0321754 | A1* | 11/2015 | Uebori | G05D 1/0011 244/17.23 |
| 2017/0210480 | A1* | 7/2017 | Lauder | B64C 27/10 |
| 2019/0023383 | A1* | 1/2019 | Lauder | B64C 27/59 |
| 2019/0210717 | A1* | 7/2019 | Lauder | B64C 27/32 |
| 2020/0001992 | A1† | 1/2020 | Wittke | |
| 2020/0231275 | A1* | 7/2020 | Groman | F04D 25/0606 |
| 2020/0331603 | A1* | 10/2020 | Green | B64D 9/00 |
| 2020/0377208 | A1* | 12/2020 | Marshall | F01D 25/16 |
| 2021/0323661 | A1* | 10/2021 | Ge | B64C 27/80 |

FOREIGN PATENT DOCUMENTS

| | | | | |
|---|---|---|---|---|
| DE | 102011053787 | A1 † | 3/2013 | |
| DE | 202020107025 | U1 * | 2/2021 | B64C 17/02 |
| DE | 102019123725 | A1 * | 3/2021 | B64C 27/10 |
| DE | 102019123726 | A1 * | 3/2021 | |
| ES | 2277476 | B1 † | 7/2007 | |
| FR | 3014411 | A1 * | 6/2015 | B64C 13/16 |
| RU | 2742513 | C2 * | 2/2021 | |
| WO | WO-2005086563 | A2 * | 9/2005 | B64C 27/02 |

OTHER PUBLICATIONS

Appendix document for U.S. Appl. No. 16/741,770, 16741770,Appendix_to_the_specification,2020-01-14a.*
Fernandes, Stanrich D.; Performance Analysis of a Coaxial Helicopter in Hover and Forward Flight; Dissertations and Theses 326; Embry-Riddle Aeronautical University; Daytona Beach, Florida; 2017.
Ramasam, Manikandan; Measurements Comparing Hover Performance of Single, Coaxial, Tandem, and Tilt-Rotor Configurations; AHS 69th Annual Forum; Phoenix, AZ; May 21-23, 2013.

* cited by examiner
† cited by third party

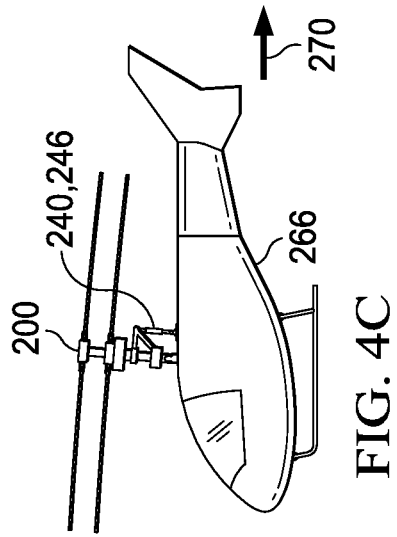
FIG. 4A
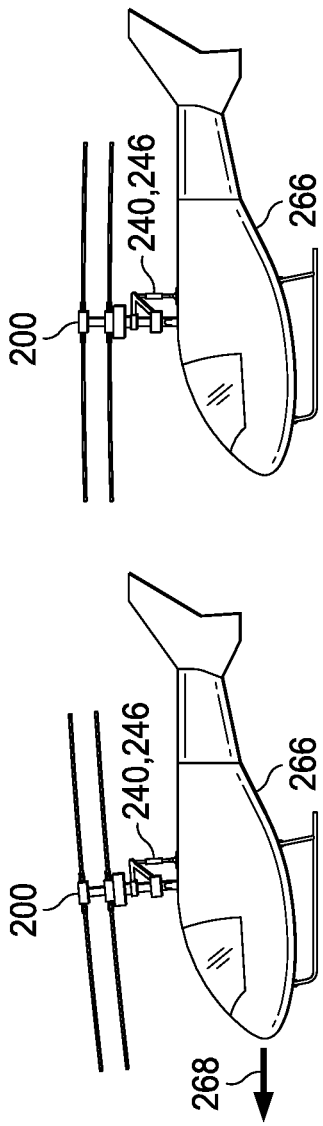
FIG. 4B
FIG. 4C
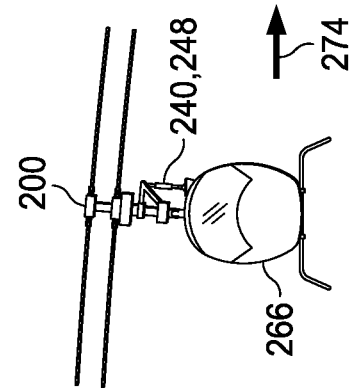
FIG. 4D
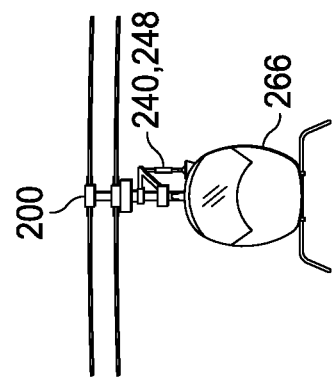
FIG. 4E
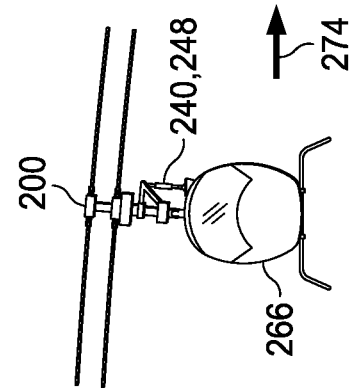
FIG. 4F

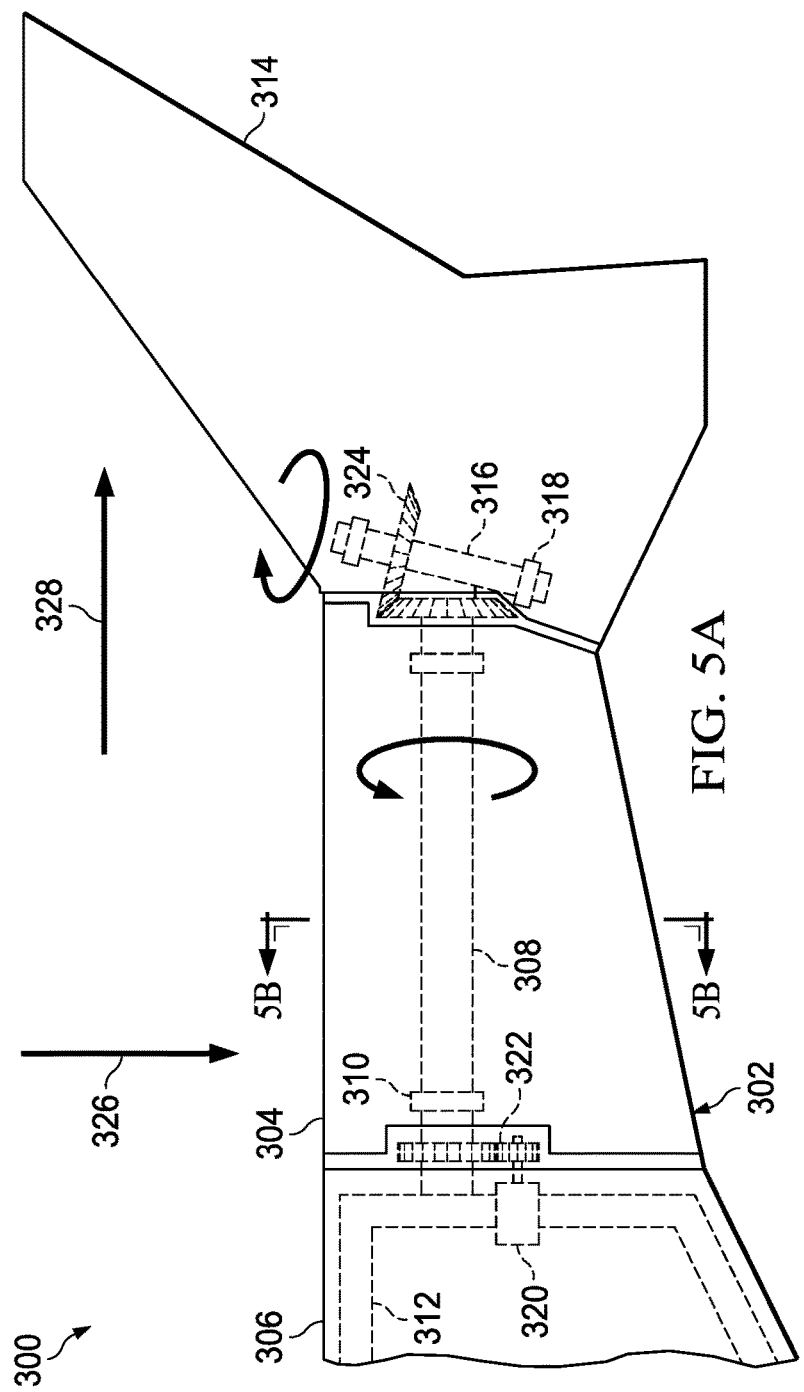
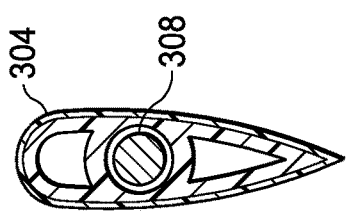
FIG. 5A
FIG. 5B

COAXIAL ROTOR SYSTEMS FOR VTOL AIRCRAFT

TECHNICAL FIELD OF THE DISCLOSURE

The present disclosure relates, in general, to coaxial rotor systems for vertical takeoff and landing aircraft and, in particular, to coaxial rotor systems that include top and bottom rotor assemblies and a motor coupled to one of the rotor assemblies, the coaxial rotor systems utilizing a torque reaction force responsive to the output of the motor to rotate at least one of the rotor assemblies.

BACKGROUND

In a traditional coaxial rotor system designed for vertical takeoff and landing (VTOL) aircraft, top and bottom coaxial rotors are connected to a transmission in the fuselage by two concentric masts, one inside of the other. Gearing within the transmission rotates the two masts in opposite directions when power is supplied by an engine so that the top and bottom rotors counter rotate. Coaxial rotor systems can be an energy efficient method for generating vertical lift, and therefore have been utilized by some existing VTOL aircraft. For example, because coaxial rotor systems manage aircraft yaw by varying the torque distribution between the top and bottom rotors, VTOL aircraft with coaxial rotor systems do not require a tail rotor, which can save 10-15 percent in total power expenditure. Furthermore, the power efficiency of a coaxial rotor system may be 6-9 percent more efficient than a traditional single rotor system of comparable disc loading and solidity. Conventional, single rotor helicopters also have a limited top speed due to the problem of retreating blade stall, in which the rotor blade on the retreating side of the rotor disc in forward flight experiences loss of lift due to the rotorcraft's linear forward flight velocity exceeding the rotor blade's minimum angular velocity for lift production. Aircraft having coaxial rotor systems overcome the phenomena of retreating blade stall since one or more rotor blades advance on both sides of the rotorcraft during flight, allowing for a faster forward airspeed.

Nonetheless, the adoption of coaxial rotor systems by existing aircraft has been limited due to their complexity and costliness. For example, existing coaxial rotor systems require a transmission, which adds weight and negatively impacts the power efficiency of the aircraft. Furthermore, existing coaxial rotor systems may require adverse yaw compensation during autorotation due to changes in aerodynamics between the top and bottom rotors, which is counterintuitive and hazardous in emergency scenarios. Accordingly, a need has arisen for lighter, more power efficient coaxial rotor systems that do not require a transmission and address the deficiencies of existing coaxial rotor systems that have led to their limited adoption in modern aircraft.

SUMMARY

In a first aspect, the present disclosure is directed to a coaxial rotor system for a rotorcraft including a mast, a top rotor assembly and a bottom rotor assembly. The top rotor assembly is coupled to the distal end of the mast. The bottom rotor assembly includes a motor configured to provide rotational energy to the mast, thereby rotating the top rotor assembly. The bottom rotor assembly experiences a torque reaction force responsive to the motor rotating the mast such that the top and bottom rotor assemblies counter rotate.

In some embodiments, the mast may form a mast plate disposed in the bottom rotor assembly and the bottom rotor assembly may be rotatably coupled to the mast plate via a thrust bearing. In certain embodiments, the top and bottom rotor assemblies may each include fixed pitch rotor blades. In other embodiments, the top and bottom rotor assemblies may each include spring-loaded rotor blades having a manually adjustable pitch. In some embodiments, the bottom rotor assembly may include a bottom rotor hub and the motor may be coupled to the underside of the bottom rotor hub. In certain embodiments, the bottom rotor assembly may include a planetary gear system and the motor may be rotatably coupled to the mast via the planetary gear system.

In some embodiments, the motor may be rotatably coupled to the mast via a bearing. In certain embodiments, the motor may be a yokeless motor. In some embodiments, the mast may include an upper mast hingeably coupled to a mast base and the coaxial rotor system may include a directional control assembly configured to tilt the upper mast relative to the mast base. In such embodiments, the directional control assembly may be configured to longitudinally and laterally tilt the upper mast relative to the mast base. In certain embodiments, the upper mast may be hingeably coupled to the mast base via a cardan joint. In some embodiments, the directional control assembly may be disposed below the bottom rotor assembly. In certain embodiments, the directional control assembly may be rotatably coupled to the mast via a bearing. In some embodiments, the directional control assembly may include a rotor tilting subassembly including a horizontal arm coupled to the upper mast and a vertical arm including a tilt actuator coupled to the horizontal arm. In such embodiments, the tilt actuator may be configured to tilt the upper mast via the horizontal arm. In some embodiments, the rotor tilting subassembly may include a longitudinal rotor tilting subassembly and a lateral rotor tilting subassembly spaced approximately 90 degrees from the longitudinal rotor tilting subassembly about the mast. In certain embodiments, the coaxial rotor system may include a slip ring below the bottom rotor assembly configured to transmit power to the motor.

In some embodiments, the top and bottom rotor assemblies may each include variable pitch rotor blades and the coaxial rotor system may include a collective control pitch assembly disposed between the top and bottom rotor assemblies configured to vary collective pitch of the rotor blades responsive to rotation of the mast. In certain embodiments, the collective control pitch assembly may include a translational sleeve configured to rotate with the mast and pitch arms interposed between the translational sleeve and the rotor blades. In some embodiments, the collective control pitch assembly may include a limiter base rotatably coupled to the underside of the translational sleeve and a spring interposed between the limiter base and the bottom rotor assembly configured to bias the translational sleeve toward the top rotor assembly.

In some embodiments, the limiter base may be rotatably coupled to the translational sleeve via a thrust bearing. In certain embodiments, the collective control pitch assembly may include an adjustable collective limiter interposed between the limiter base and the bottom rotor assembly configured to limit downward translation of the translational sleeve to control maximum collective pitch of the rotor blades. In some embodiments, the distal ends of the pitch arms may be coupled to trailing ends of the rotor blades and the proximal ends of the pitch arms may be rotatably coupled to the translational sleeve. In certain embodiments, the pitch arms may include upper pitch arms interposed between the translational sleeve and the rotor blades of the top rotor assembly and lower pitch arms interposed between the translational sleeve and the rotor blades of the bottom rotor assembly. In some embodiments, the mast may include one or more splines and the translational sleeve may form one or more spline grooves to receive the splines. In such embodiments, the translational sleeve may translate along the splines and the splines may constrain rotation of the translational sleeve relative to the mast. In certain embodiments, the mast may be rotatably coupled to the top rotor assembly up to a predetermined number of revolutions via a thrust bearing. In such embodiments, the translational sleeve may form a ball screw nut cavity having internal threads and the collective control pitch assembly may include a ball screw having external threads complementary to the internal threads of the ball screw nut cavity, the ball screw coupled to the top rotor assembly. Also in such embodiments, the translational sleeve may translate downward and the ball screw may translate out of the ball screw nut cavity responsive to relative rotation between the mast and the top rotor assembly.

In a second aspect, the present disclosure is directed to an aircraft including a fuselage, a mast, a top rotor assembly and a bottom rotor assembly. The mast is rotatably coupled to the fuselage. The top rotor assembly is coupled to the distal end of the mast. The bottom rotor assembly includes a motor configured to provide rotational energy to the mast, thereby rotating the top rotor assembly. The bottom rotor assembly experiences a torque reaction force responsive to the motor rotating the mast such that the top and bottom rotor assemblies counter rotate.

In some embodiments, the base of the mast may be rotatably coupled to the fuselage via a thrust bearing. In certain embodiments, the mast may be rotatably coupled to the fuselage via a gimbal attachment such that the mast has a gimballing degree of freedom relative to the fuselage. In some embodiments, the aircraft may include a yaw control system including a tailboom control surface rotatably coupled to the aft end of the fuselage. In such embodiments, the yaw control system may include a vertical fin rotatably coupled to the aft end of the tailboom control surface. In some embodiments, the yaw control system may include a yaw control actuator configured to synchronously rotate the tailboom control surface and the vertical fin. In certain embodiments, the aircraft may include one or more batteries in a subfloor of the fuselage configured to power the motor.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4F are side and front views of a rotorcraft in longitudinal and lateral motion utilizing a coaxial rotor system in accordance with embodiments of the present disclosure;

FIGS. 5A-5E are various views of a yaw control system for a rotorcraft utilizing a coaxial rotor system in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
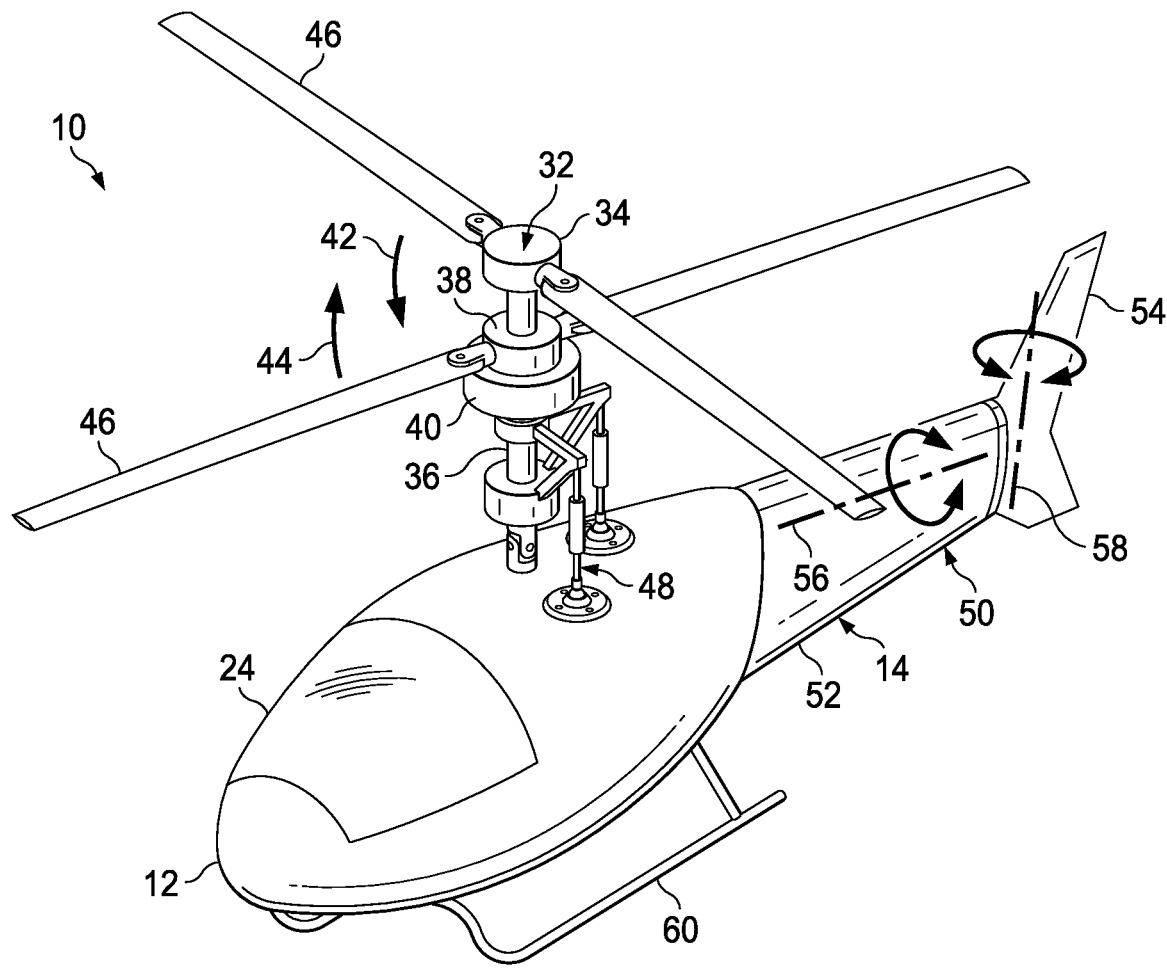
FIGS. 1A-1B are schematic illustrations of a rotorcraft having a coaxial rotor system in accordance with embodiments of the present disclosure.
Figure 1B:
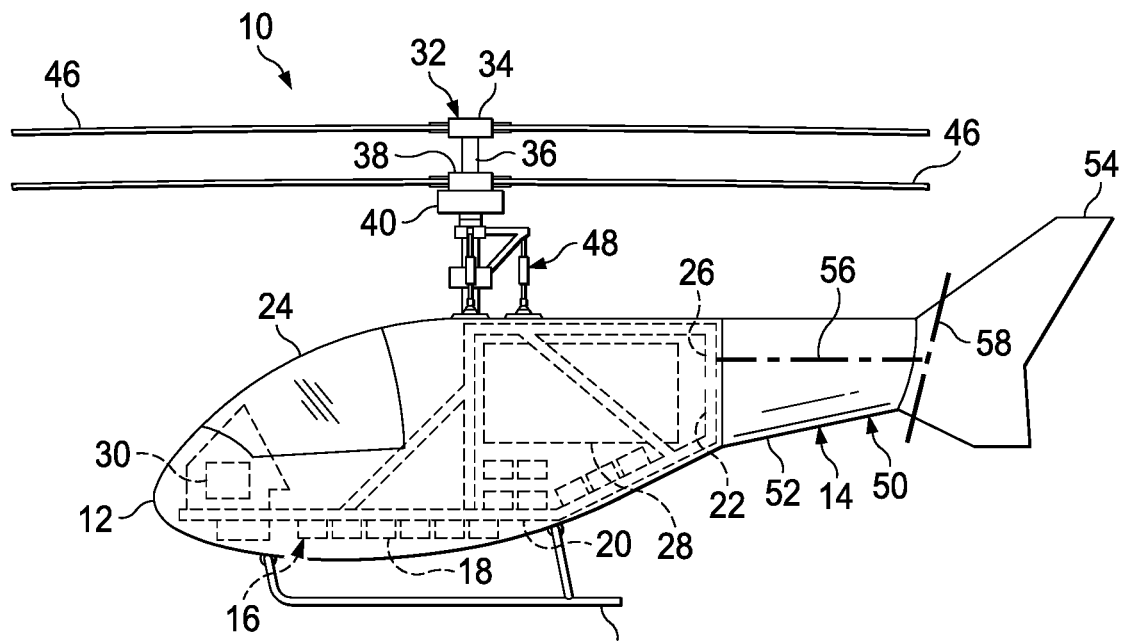

Referring to FIGS. 1A-1B in the drawings, a rotorcraft in the form of a helicopter is schematically illustrated and generally designated 10. Rotorcraft 10 includes a fuselage 12 and a tailboom 14 extending from fuselage 12 in the aft direction. Fuselage 12 houses a power system 16 to provide power to the various systems of rotorcraft 10. Power system 16 includes batteries 18 disposed in a subfloor compartment 20 and an aft cabin area 22 of fuselage 12. Locating batteries 18 in subfloor compartment 20 of fuselage 12 lowers the center of gravity of rotorcraft 10 for improved maneuvering. Batteries 18 may be any type of battery such as lithium ion or fluoride ion batteries. In other embodiments, power system 16 may include an internal combustion engine, a generator, a renewable energy source such as solar panels or any other type of power source. The forward section of fuselage 12 includes an occupant cabin 24 for one or more pilots and/or occupants. In other embodiments, rotorcraft 10 may be an unmanned aerial system and include no occupants.

Fuselage 12 forms a payload bay 26 in which a payload 28 is received. In some embodiments, payload 28 may be a releasable payload that is secured to payload bay 26 while rotorcraft 10 is grounded, and which is released from payload bay 26 while rotorcraft 10 is either on the ground or in flight. The different types of payloads that are receivable by payload bay 26 are numerous. For example, payload 28 may include a weapon, video camera, infrared imaging device, high definition camera, chemical sensor, cargo, passenger belongings, additional batteries or any other suitable payload. In a more specific example, a weapon such as a bomb or cargo such as a deliverable package may be released from payload bay 26 either on the ground or during flight. Payload bay 26 may also store passenger luggage or belongings in embodiments in which rotorcraft 10 serves as an air taxi. Payload 28 may be configured to provide data to a flight control system 30 of rotorcraft 10 and flight control system 30 may be configured to control, manipulate or release payload 28. In other embodiments, fuselage 12 may lack payload bay 26 and instead aft cabin area 22 of fuselage 12 may be used as an occupant cabin, thereby increasing the occupant cabin space of rotorcraft 10.

The primary propulsion system for rotorcraft 10 is a coaxial rotor system 32. Coaxial rotor system 32 includes a top rotor assembly 34 coupled to the distal end of a mast 36. A bottom rotor assembly 38 includes a motor 40 that provides rotational energy to mast 36, thereby rotating top rotor assembly 34. Thus, motor 40 has an output that drives top rotor assembly 34. Motor 40 may be powered by batteries 18. Bottom rotor assembly 38 experiences a torque reaction force in response to motor 40 rotating mast 36 such that top and bottom rotor assemblies 34, 38 counter rotate as indicated by directional arrows 42, 44. Previously, the rotors of coaxial rotor systems have been counter rotated using opposite gearing in a transmission. Because coaxial rotor system 32 uses the torque reaction between top and bottom rotor assemblies 34, 38 to counter rotate top and bottom rotor assemblies 34, 38, rotorcraft 10 does not require a transmission, which reduces weight and increases the available volume in fuselage 12 to provide design flexibility with respect to cabin space. In the illustrated embodiment, top and bottom rotor assemblies 34, 38 include fixed pitch rotor blades 46, although in other embodiments rotor blades 46 may be variable pitch rotor blades. Although top and bottom rotor assemblies 34, 38 are each illustrated as including two rotor blades, top and bottom rotor assemblies 34, 38 may have any number of rotor blades.

Coaxial rotor system 32 includes a directional control assembly 48. Directional control assembly 48 tilts mast 36 in the longitudinal and lateral directions for longitudinal and lateral directional control of rotorcraft 10. Longitudinal and lateral directional control is achieved by displacing the center of gravity of rotorcraft 10 relative to the rotor axis. Rotorcraft 10 thus does not require rotor blades 46 to have conventional cyclic control, although in other embodiments either or both of top or bottom rotor assemblies 34, 38 may include a conventional swashplate-based cyclic blade pitch mechanism. Because top and bottom rotor assemblies 34, 38 are rotationally isolated from fuselage 12, rotorcraft 10 uses control surfaces in a yaw control system 50 to manage the yaw of rotorcraft 10. More particularly, yaw control of rotorcraft 10 is achieved by deflecting rotor airflow through an articulated tailboom control surface 52 during hover and an articulated vertical fin 54 during forward flight. Tailboom control surface 52 is rotatable about axis 56 and vertical fin 54 is rotatable about canted axis 58. Tailboom control surface 52 and vertical fin 54 may be synchronously or independently rotatable and may be actuated using mechanical links or one or more electric servomotors. Rotorcraft 10 also includes landing skids 60.

It should be appreciated that rotorcraft 10 is merely illustrative of a variety of aircraft that can implement the embodiments disclosed herein. Indeed, coaxial rotor system 32 may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, electric recreational VTOL aircraft, air taxis, payload transport drones and the like. As such, those skilled in the art will recognize that coaxial rotor system 32 can be integrated into a variety of aircraft configurations. It should be appreciated that even though aircraft are particularly well-suited to implement the embodiments of the present disclosure, non-aircraft vehicles and devices can also implement the embodiments.

Figure 2:
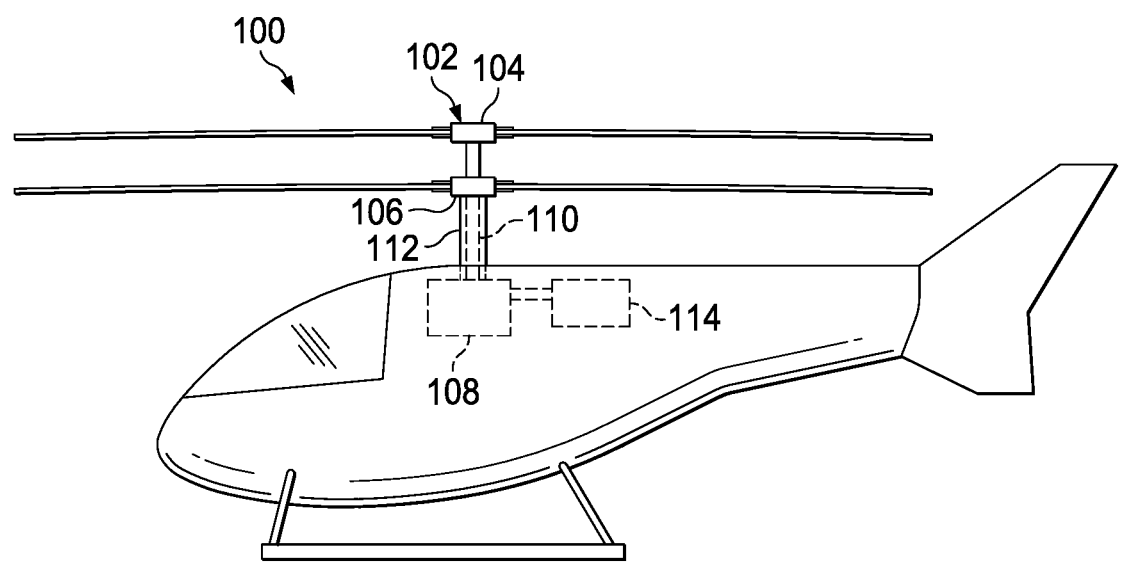
FIG. 2 is a side view of a coaxial rotor system utilized on previous aircraft.

Referring to FIG. 2 in the drawings, rotorcraft 100 includes a previous type of coaxial rotor system 102. Coaxial rotor system 102 includes top and bottom rotor assemblies 104, 106 coupled to transmission 108 via two concentric masts 110, 112. Top rotor assembly 104 is coupled to transmission 108 via inner mast 110 and bottom rotor assembly 106 is coupled to transmission 108 via outer mast 112. Masts 110, 112 are counter rotated relative to one another by opposite gearing in transmission 108, which receives rotational energy from an engine 114. Because rotorcraft 100 manages yaw using differential torque between top and bottom rotor assemblies 104, 106, adverse yaw compensation may be required during autorotation due to the changes in aerodynamics between top and bottom rotor assemblies 104, 106, which is counterintuitive and hazardous in emergency scenarios. Transmission 108, which is required by coaxial rotor system 102, also reduces the amount of fuselage cabin space that may be used for other purposes such as battery, payload or occupant space. Coaxial rotor system 102 also relies upon cyclic control of the rotor blades of top and bottom rotor assemblies 104, 106 for longitudinal and lateral movement of rotorcraft 100. Cyclic control mechanisms for coaxial rotor systems, however, can be complex and difficult to maintain.

Figure 3A:
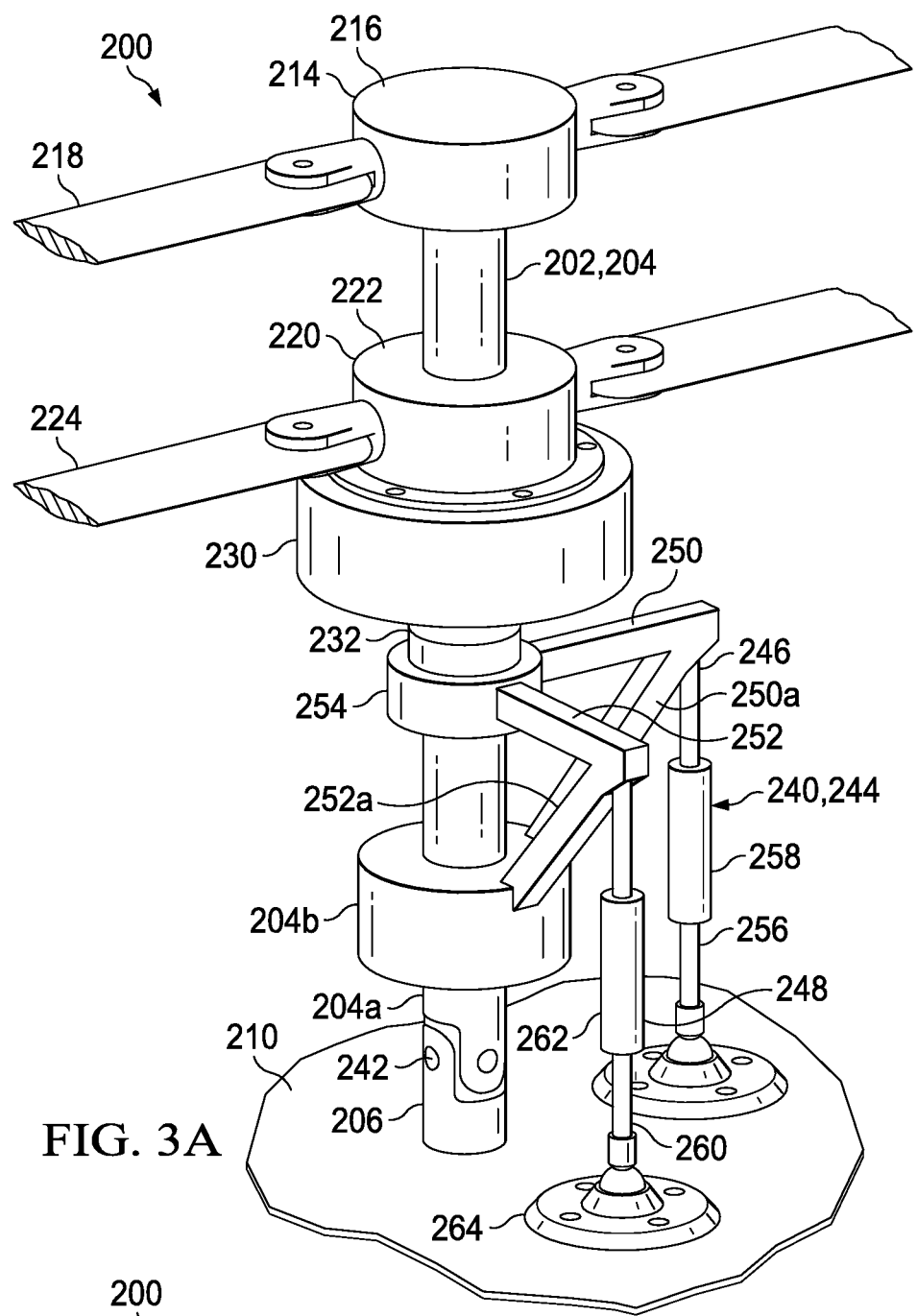
FIGS. 3A-3C are various views of a coaxial rotor system in accordance with embodiments of the present disclosure.
Figure 3B:
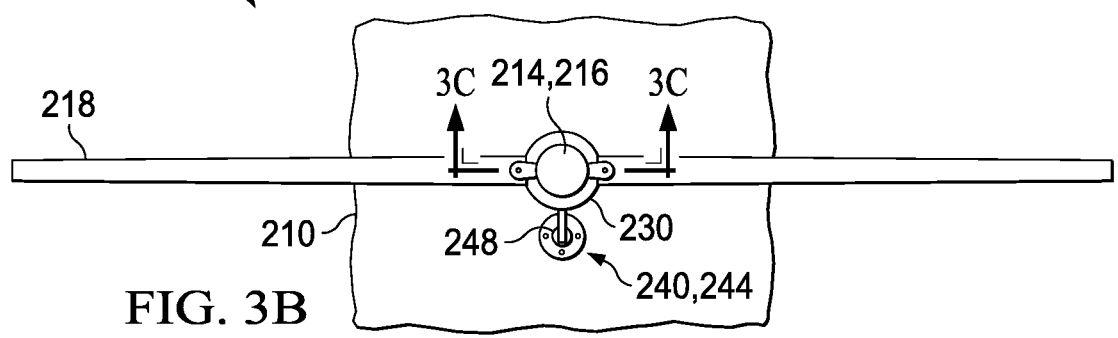
Figure 3C:
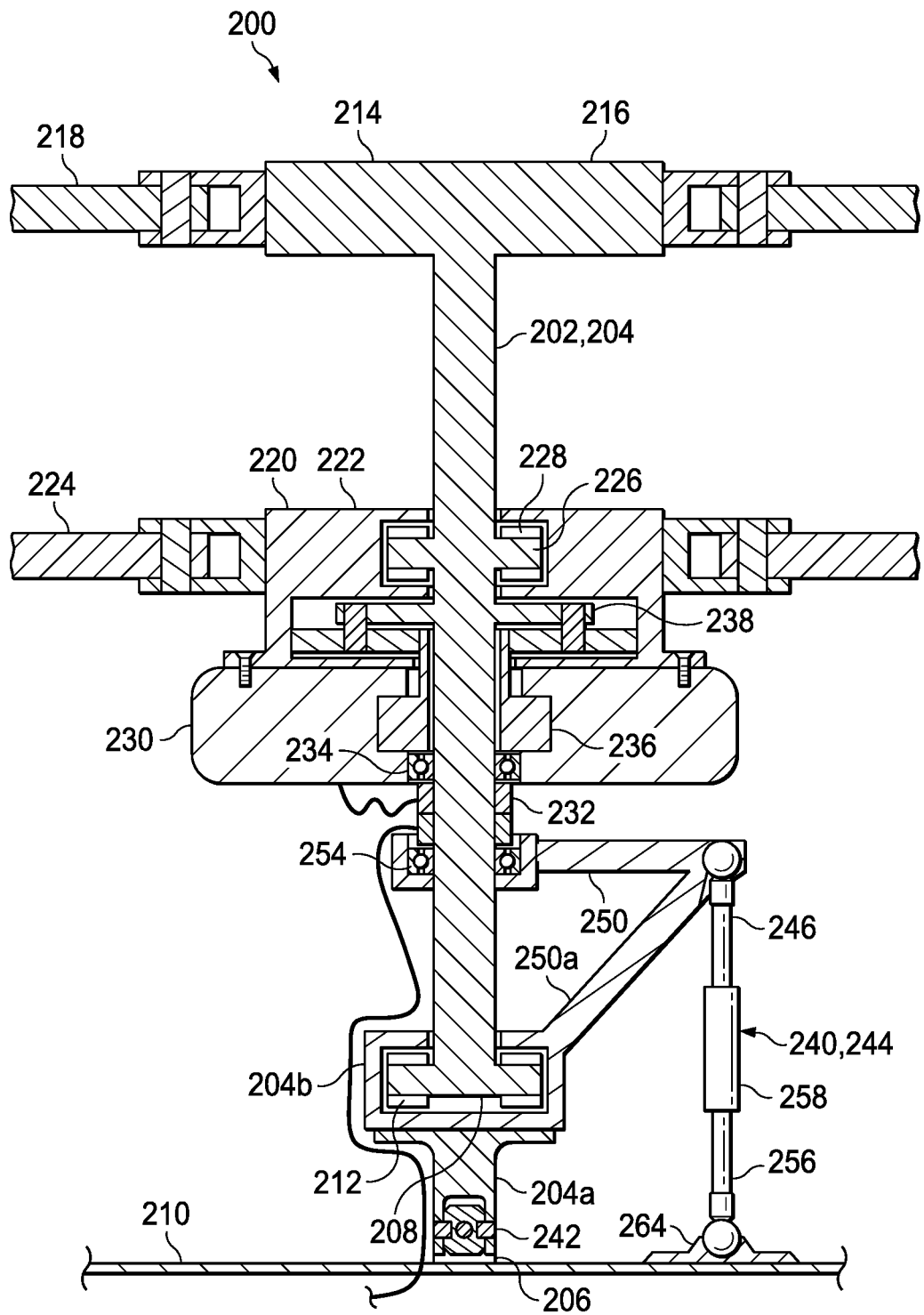

Referring to FIGS. 3A-3C in the drawings, a coaxial rotor system for a rotorcraft is schematically illustrated and generally designated 200. Coaxial rotor system 200 is supported by mast 202, which includes an upper mast 204 hingeably coupled to a mast base 206. Upper mast 204 forms a mast plate 208 that is rotatably coupled to fuselage 210 and, more specifically, to a lower portion 204a of upper mast 204 via thrust bearing 212. Mast plate 208 and thrust bearing 212 are at least partially enclosed by casing 204b, which is located above fuselage 210. In other embodiments, mast plate 208, thrust bearing 212 and casing 204b may be inside fuselage 210.

Top rotor assembly 214 includes a top rotor hub 216 and fixed pitch rotor blades 218 extending therefrom. Top rotor hub 216 is fixedly coupled to the distal end of mast 202. Bottom rotor assembly 220 is rotatably coupled to mast 202. Bottom rotor assembly 220 includes a bottom rotor hub 222 and fixed pitch rotor blades 224 extending therefrom. Mast 202 forms mast plate 226 disposed in bottom rotor hub 222. Bottom rotor assembly 220 is rotatably coupled to mast plate 226 via thrust bearing 228. Mast plate 226 and thrust bearing 228 form the interface at which lift generated by bottom rotor assembly 220 is transferred to fuselage 210 and the remainder of the rotorcraft. Bottom rotor assembly 220 is rotationally isolated, and therefore free to rotate, in relation to fuselage 210 due to the inclusion of thrust bearing 228. Also, because the upper portion of upper mast 204 is rotatably coupled to fuselage 210 via thrust bearing 212, top and bottom rotor assemblies 214, 220 are rotationally isolated from fuselage 210 such that net torque experienced by top and bottom rotor assemblies 214, 220 is not transferred to fuselage 210.

Motor 230, which may include a casing, is fixedly coupled to the underside of bottom rotor hub 222. Power is transmitted to motor 230 via a slip ring 232, which is located on mast 202 below bottom rotor assembly 220. Slip ring 232 may be a high current rotational electrical connector such as a brush slip ring or a liquid metal-based slip ring. Motor 230 is rotatably coupled to mast 202 via ball bearing 234 to permit motor 230 to freely rotate about mast 202. Motor 230 is radially symmetric to minimize imbalances during the operation of coaxial rotor system 200. Motor 230 is a yokeless motor that lacks a central shaft and allows for mast 202 to be inserted therethrough, adding rigidity to coaxial rotor system 200. Bottom rotor assembly 220 may include any number of stacked yokeless motors depending on the power requirements of coaxial rotor system 200. In other embodiments, motor 230 may alternatively be coupled to top rotor assembly 214.

Motor 230 provides rotational energy to mast 202 to rotate top rotor assembly 214. More particularly, motor 230 rotates ring gear 236 disposed therein, which acts as an input to planetary gear system 238. Motor 230 is rotatably coupled to mast 202 via planetary gear system 238 to provide a suitable gear ratio between the output of motor 230 and the rotational speed of top rotor assembly 214. In the illustrated embodiment, planetary gear system 238 is encased by bottom rotor hub 222. Although planetary gear system 238 is not required to rotate mast 202, planetary gear system 238 may be useful if the baseline output torque of motor 230 is insufficient to rotate top rotor assembly 214 at a desirable rotational speed. In other embodiments, planetary gear system 238 may be a magnetic planetary gear system. When motor 230 rotates mast 202 via planetary gear system 238, bottom rotor assembly 220 experiences a torque reaction force such that top and bottom rotor assemblies 214, 220 counter rotate. This counter rotating motion between top and bottom rotor assemblies 214, 220 is generated based on Newton's Third Law wherein every action has an equal and opposite reaction. Because motor 230 is free to rotate in relation to fuselage 210, the motor output torque is reacted by top rotor assembly 214, causing top and bottom rotor assemblies 214, 220 to rotate in opposite directions with substantially equal torque sharing. The rotational speeds of top and bottom rotor assemblies 214, 220 may therefore inherently compensate for variations in flight condition and thrust setting.

Coaxial rotor system 200 includes directional control assembly 240, which longitudinally and laterally tilts upper mast 204 relative to mast base 206. Cardan joint 242, which hingeably couples upper mast 204 to mast base 206, allows for both longitudinal and lateral tilting of upper mast 204 relative to mast base 206. Directional control assembly 240 is located below bottom rotor assembly 220 and casing 204b and therefore interposed between bottom rotor assembly 220 and fuselage 210. Directional control assembly 240 includes a rotor tilting subassembly 244. Rotor tilting subassembly 244 includes a longitudinal rotor tilting subassembly 246 and a lateral rotor tilting subassembly 248. Longitudinal rotor tilting subassembly 246 is spaced approximately 90 degrees from lateral rotor tilting subassembly 248 about mast 202. Longitudinal and lateral rotor tilting subassemblies 246, 248 include horizontal arms 250, 252, respectively, having proximal ends coupled to upper mast 204 via ball bearing 254. Longitudinal and lateral rotor tilting subassemblies 246, 248 includes diagonal support arms 250a, 252a having proximal ends coupled to casing 204b and distal ends coupled to horizontal arms 250, 252, respectively. Longitudinal rotor tilting subassembly 246 includes vertical arm 256 interposed between horizontal arm 250 and fuselage 210. Vertical arm 256 includes a tilt actuator 258. Lateral rotor tilting subassembly 248 includes vertical arm 260 interposed between horizontal arm 252 and fuselage 210. Vertical arm 260 includes tilt actuator 262. Tilt actuators 258, 262 may include servomotors, stepper motors or other types of actuators. The bottom ends of vertical arms 256, 260 may be coupled to fuselage 210 via ball joint fittings 264 and the top ends of vertical arms 256, 260 may be coupled to horizontal arms 250, 252 via ball joints to permit movement in multiple planes. Tilt actuator 258 tilts upper mast 204 in the longitudinal direction and tilt actuator 262 tilts upper mast 204 in the lateral direction, thereby achieving longitudinal and lateral directional control for the rotorcraft. Longitudinal and lateral tilting of upper mast 204 may alternatively be achieved mechanically or manually via mechanical linkages to horizontal arms 250, 252.

By integrating motor 230 into bottom rotor assembly 220 and rotationally isolating coaxial rotor system 200 from fuselage 210, coaxial rotor system 200 does not require a transmission, thereby increasing power efficiency and reducing the weight of the rotorcraft. In some examples, removal of the transmission may increase the power efficiency of the rotorcraft by approximately 5 percent compared to coaxial rotor aircraft that require a transmission. The lack of a transmission also results in less transmission losses, better mechanical efficiency and reduced maintenance due to simplified design. Additional space is also available in fuselage 210 where the transmission was located in previous aircraft, resulting in increased design flexibility with respect to the interior of fuselage 210. The use of motor 230 also reduces emissions and noise as compared to previous coaxial rotor systems. The inclusion of directional control assembly 240 eliminates the need for a cyclic rotor pitch mechanism, which has a high part count and can be difficult to maintain. Coaxial rotor system 200 also lowers the pilot's workload due to automatic torque balancing between top and bottom rotor assemblies 214, 220 when changing flight regimes. Unlike aircraft having multiple small rotors such as quadcopter drones, rotorcraft having coaxial rotor system 200 benefit from higher power efficiency due to a larger rotor diameter, lower disc loading and autorotation capability. Coaxial rotor system 200 does not require a tail rotor, further reducing weight and complexity. In some examples, rotorcraft having coaxial rotor system 200 may be 21 to 29 percent more power efficient in hover than a conventional helicopter of comparable size due to the removal of the tail rotor and transmission and power efficiency advantages of coaxial rotors as compared to traditional single rotor systems. Because autorotation capability increases with helicopter rotor inertia, coaxial rotor system 200 offers another benefit when compared to a traditional coaxial rotor since motor 230 adds to the inertia of bottom rotor assembly 220.

Referring to FIGS. 4A-4F in the drawings, longitudinal and lateral directional control of rotorcraft 266 having coaxial rotor system 200 is schematically illustrated. In FIGS. 4A-4C, longitudinal rotor tilting subassembly 246 of directional control assembly 240 tilts coaxial rotor system 200 in the longitudinal direction. More specifically, longitudinal rotor tilting subassembly 246 forwardly tilts coaxial rotor system 200 to move rotorcraft 266 in a forward direction of travel 268. Longitudinal rotor tilting subassembly 246 aftwardly tilts coaxial rotor system 200 to move rotorcraft 266 in an aftward direction of travel 270. In FIGS. 4D-4F, lateral rotor tilting subassembly 248 of directional control assembly 240 laterally tilts coaxial rotor system 200. More specifically, lateral rotor tilting subassembly 248 rightwardly tilts coaxial rotor system 200 to move rotorcraft 266 in a rightward direction of travel 272. Lateral rotor tilting subassembly 248 leftwardly tilts coaxial rotor system 200 to move rotorcraft 266 in a leftward direction of travel 274.

Figure 5E:
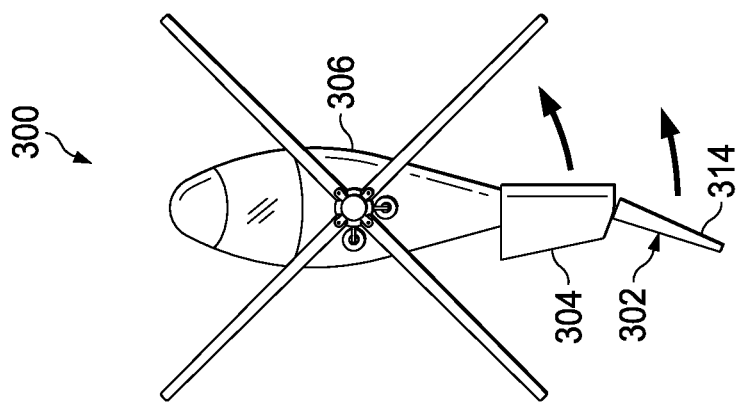
Figure 5D:
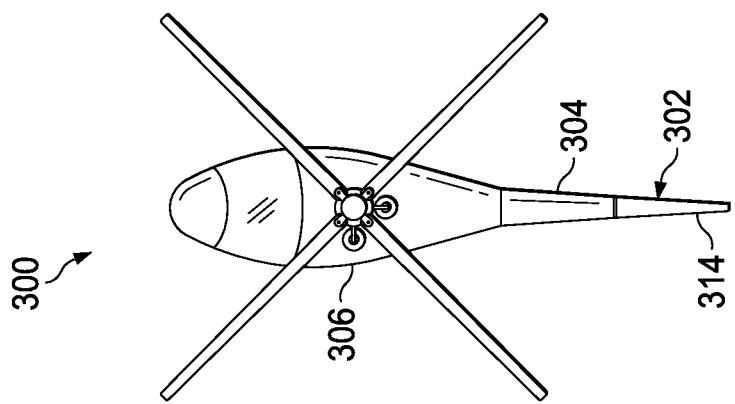
Figure 5C:
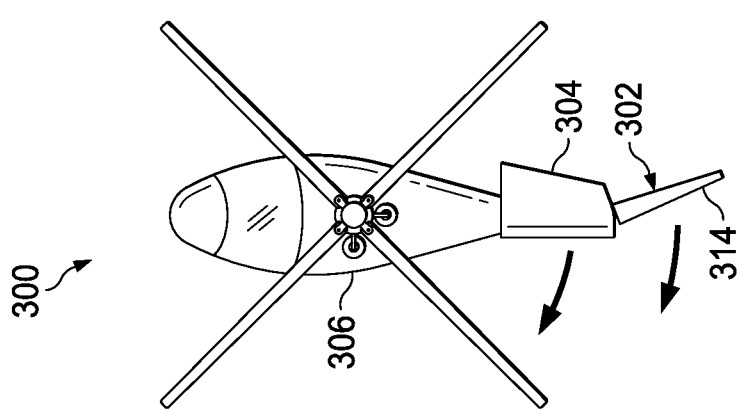

Referring to FIGS. 5A-5E in the drawings, a rotorcraft 300 having yaw control system 302 is schematically illustrated. Tailboom control surface 304 is rotatably mounted to the aft end of fuselage 306. Tailboom control surface 304 is supported by, and rotates about, tailboom support shaft 308 including one or more bearings 310. The forward end of tailboom support shaft 308 is coupled to airframe 312 of fuselage 306. Yaw control system 302 also includes vertical fin 314, which is rotatably coupled to the aft and of tailboom control surface 304. Vertical fin 314 is supported by, and rotates about, vertical fin support shaft 316 including one or more bearings 318. Since some airflow is directed inward due to the rotor streamtube effect, vertical fin support shaft 316 is canted to minimize adverse yaw from vertical fin 314 while rotorcraft 300 hovers. Yaw control system 302 includes yaw control actuator 320, which synchronously rotates tailboom control surface 304 and vertical fin 314. Yaw control actuator 320 may be a servomotor, stepper motor or any other type of actuator. Yaw control actuator 320 rotates tailboom support shaft 308, which in turn rotates tailboom control surface 304, via gears 322. The rotation of tailboom support shaft 308 rotates vertical fin support shaft 316 via bevel gears 324, thus rotating vertical fin 314. Although in the illustrated embodiment tailboom control surface 304 and vertical fin 314 rotate synchronously using a geartrain including gears 322, 324, in other embodiments tailboom control surface 304 and vertical fin 314 may be independently actuated by separate and respective actuators. Yaw control system 302 may alternatively utilize a tie rod arrangement to rotate tailboom control surface 304 and vertical fan 314. In hover, rotorcraft 300 generates downward airflow 326 with reduced swirl compared to conventional single rotor helicopters. As best seen in FIGS. 5C-5E, tailboom control surface 304 is rotatable in either direction to deflect downward airflow 326, resulting in a moment on fuselage 306 in either direction as desired. In forward flight, vertical fin 314 is rotatable in either direction to deflect horizontal airflow 328, resulting in a desired moment on fuselage 306.

Figure 6A:
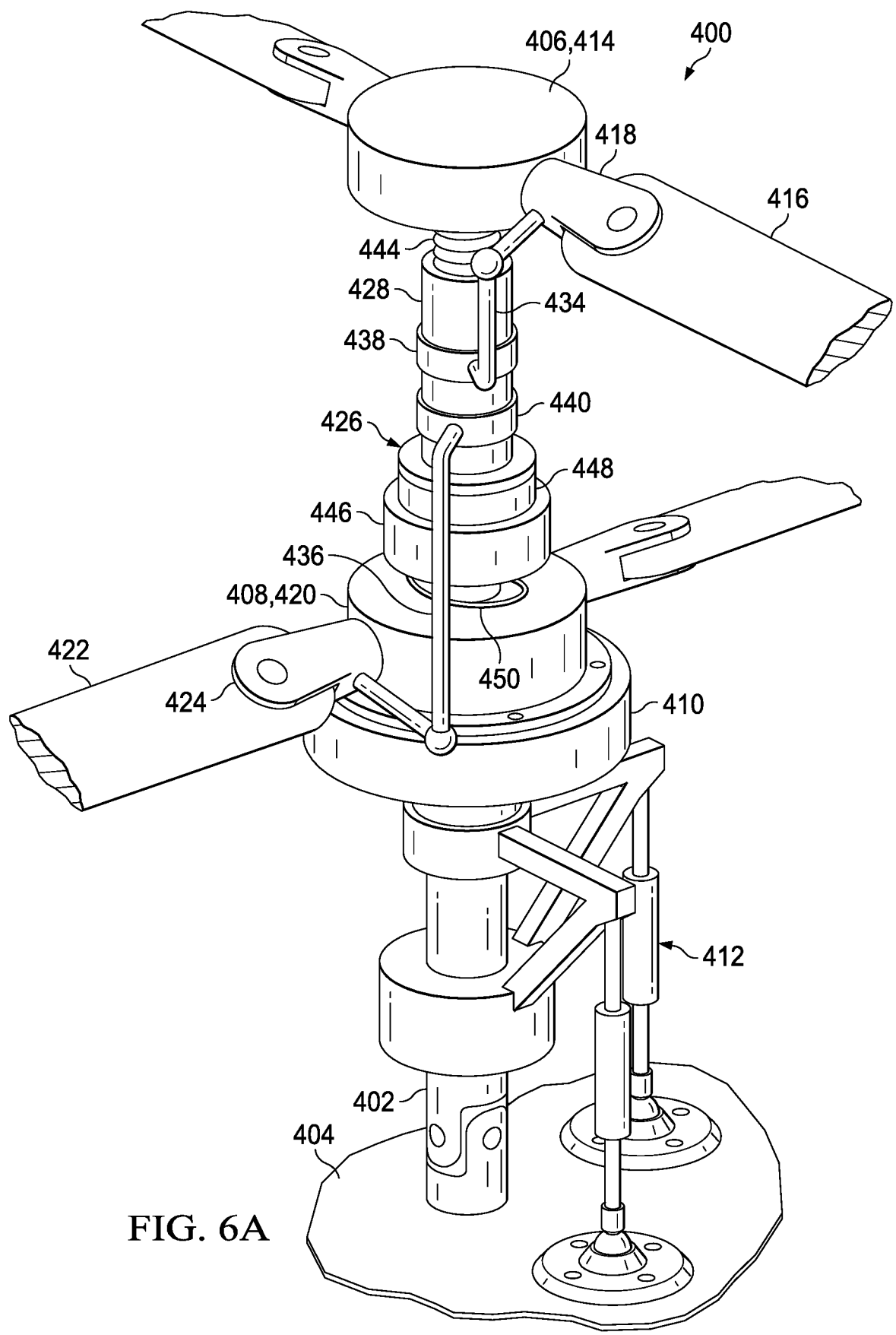
FIGS. 6A-6C are various views of a coaxial rotor system having a collective control pitch assembly in accordance with embodiments of the present disclosure.
Figure 6C:
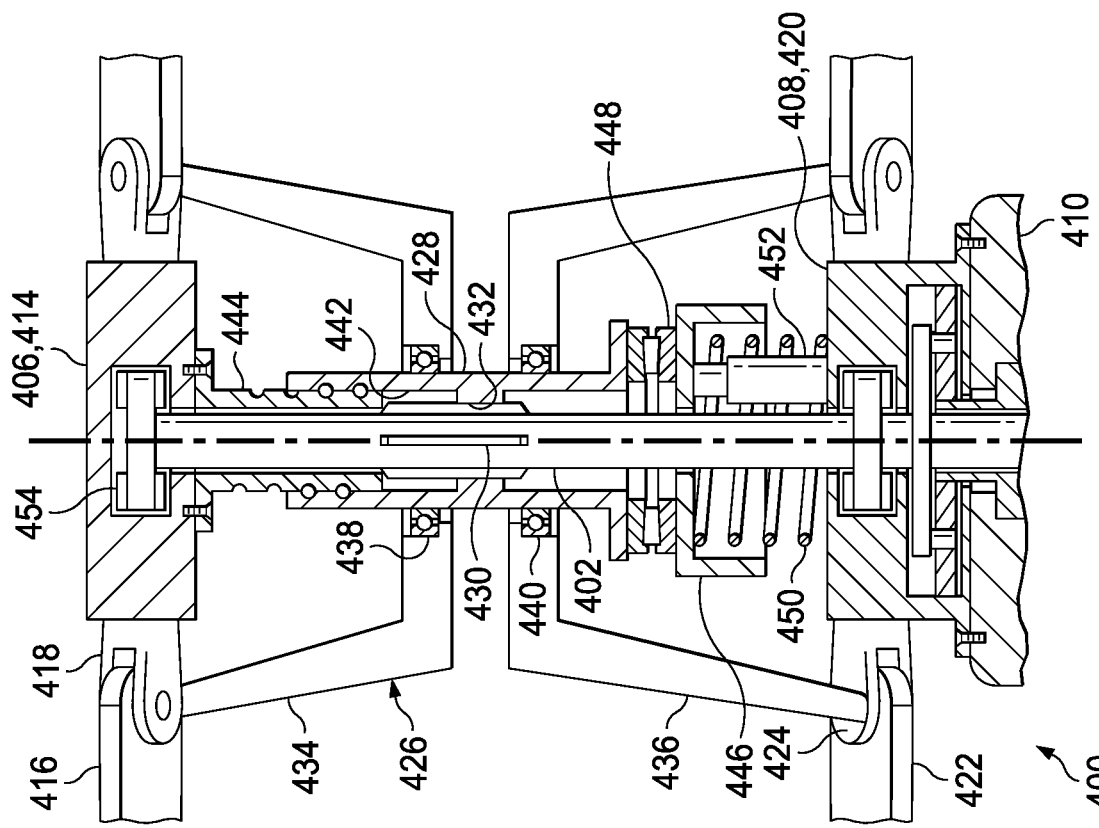
Figure 6B:
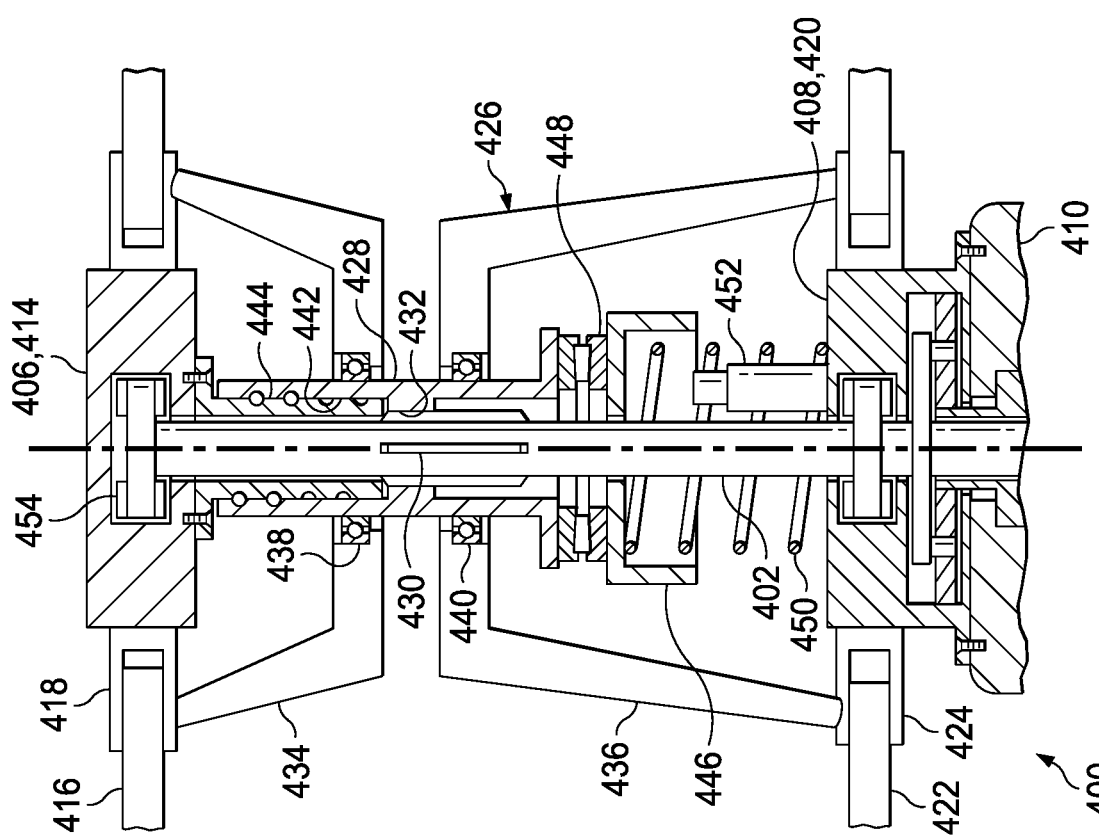

Referring to FIGS. 6A-6C in the drawings, a coaxial rotor system is schematically illustrated and generally designated 400. Mast 402 is rotatably coupled to fuselage 404 and supports top and bottom rotor assemblies 406, 408. Bottom rotor assembly 408 includes motor 410, which provides rotational energy to mast 402 to rotate top rotor assembly 406. Bottom rotor assembly 408 experiences a torque reaction force in the opposite direction when motor 410 rotates mast 402 such that top and bottom rotor assemblies 406, 408 counter rotate. Coaxial rotor system 400 includes a directional control assembly 412 to control the longitudinal and lateral movement of the rotorcraft. Top rotor assembly 406 includes top rotor hub 414 from which variable pitch rotor blades 416 extend. Rotor blades 416 are rotatably coupled to top rotor hub 414 via rotatable yoke members 418. Bottom rotor assembly 408 includes bottom rotor hub 420 from which variable pitch rotor blades 422 extend. Rotor blades 422 are rotatably coupled to bottom rotor hub 420 via rotatable yoke members 424.

Coaxial rotor system 400 includes a collective control pitch assembly 426 interposed between top and bottom rotor assemblies 406, 408 to vary the collective pitch of rotor blades 416, 422 in response to the rotation of mast 402. Collective control pitch assembly 426 includes a translational sleeve, or cam, 428 that rotates with mast 402. Translational sleeve 428 has a generally hollow cylindrical shape that surrounds mast 402. Mast 402 includes splines 430 and translational sleeve 428 forms spline grooves 432 to receive splines 430. Splines 430 constrain translational sleeve 428 to rotate with mast 402 but permit a translational degree of freedom that allows translational sleeve 428 to move up and down along mast 402. Collective control pitch assembly 426 includes upper pitch arms 434 interposed between translational sleeve 428 and rotor blades 416 of top rotor assembly 406. Collective control pitch assembly 426 also includes lower pitch arms 436 interposed between translational sleeve 428 and rotor blades 422 of bottom rotor assembly 408. The distal ends of upper pitch arms 434 are coupled to the trailing ends of rotor blades 416 via rotatable yoke members 418 and the proximal ends of upper pitch arms 434 are rotatably coupled to translational sleeve 428 via ball bearing 438. The distal ends of lower pitch arms 436 are coupled to the trailing ends of rotor blades 422 via rotatable yoke members 424 and the proximal ends of lower pitch arms 436 are rotatably coupled to translational sleeve 428 via ball bearing 440. Due to the rotatable connection between pitch arms 434, 436 and translational sleeve 428 via ball bearings 438, 440, pitch arms 434, 436 rotate in opposite directions independently of translational sleeve 428.

The upper end of translational sleeve 428 forms a ball screw nut cavity 442 having internal threads. Collective control pitch assembly 426 includes a ball screw 444 having external threads complementary to the internal threads of ball screw nut cavity 442. Ball screw 444 is translatable into and out of ball screw nut cavity 442 by a twisting motion. The top side of ball screw 444 is coupled to the underside of top rotor hub 414. Collective control pitch assembly 426 includes a limiter base 446 rotatably coupled to the underside of translational sleeve 428 via thrust bearing 448. Spring 450 is interposed between limiter base 446 and bottom rotor hub 420 and biases translational sleeve 428 upward toward top rotor assembly 406. An adjustable collective limiter 452 is coupled to the top side of bottom rotor hub 420 such that adjustable collective limiter 452 is interposed between limiter base 446 and bottom rotor assembly 408. Adjustable collective limiter 452 may include a servomotor, stepper motor or other actuator. Thrust bearing 448 between limiter base 446 and translational sleeve 428 allows limiter base 446 to rotate relative to translational sleeve 428 to prevent or reduce friction when adjustable collective limiter 452 contacts limiter base 446.

FIG. 6B shows collective control pitch assembly 426 positioned to provide little or no collective pitch to rotor blades 416, 422. FIG. 6C shows collective control pitch assembly 426 positioned to increase the collective pitch of rotor blades 416, 422 to generate lift for the rotorcraft. Collective control pitch assembly 426 increases the collective pitch angle of rotor blades 416, 422 when top and bottom rotor assemblies 406, 408 counter rotate. Unlike coaxial rotor system 200 in FIGS. 3A-3C, mast 402 is rotatably coupled to top rotor hub 414 via thrust bearing 454. Mast 402 is permitted to rotate for a predetermined number of revolutions relative to top rotor hub 414. For example, mast 402 may be permitted to rotate up to a half revolution, a full revolution or two full revolutions relative to top rotor hub 414. Translational sleeve 428 converts differential rotation between mast 402 and top rotor assembly 406 into translational motion along mast 402. More specifically, translational sleeve 428 translates downward and ball screw 444 rotates out of ball screw nut cavity 442 in response to relative rotation between mast 402 and top rotor assembly 406. Pitch arms 434, 436 transfer the vertical motion of translational sleeve 428 to the trailing edges of rotor blades 416, 422, thus causing collective blade pitch to increase when translational sleeve 428 translates downward. Adjustable collective limiter 452 limits the downward translation of translational sleeve 428 to control the maximum collective pitch of rotor blades 416, 422. Adjustable collective limiter 452 has an adjustable height that limits the collective pitch to a desired level as set by the pilot or flight control system. For example, adjustable collective limiter 452 may be lowered during takeoff if a high level of collective pitch is desired and raised during forward flight if a lower level of collective pitch is desired, or vice versa.

Collective control pitch assembly 426 adds operational flexibility and safety to coaxial rotor system 400. For example, the length of pitch arms 434, 436 may be selected such that the collective pitch of bottom rotor blades 422 is higher than the collective pitch of top rotor blades 416 to obtain optimum performance. In one non-limiting example, the length of pitch arms 434, 436 is such that the collective pitch of bottom rotor blades 422 is 1 to 5 degrees, such as 2.5 degrees, higher than the collective pitch of top rotor blades 416. Collective control pitch assembly 426 may also automatically change the collective pitch of rotor blades 416, 422 when transitioning to autorotation. For example, if motor 410 fails during flight, output torque will be reduced, translational sleeve 428 will spring upward and the collective pitch of rotor blades 416, 422 will revert to a low pitch setting such as 1 to 4 degrees to support autorotation. No pilot action is required since the transition to the autorotation collective pitch setting is automatic and no adjustment to the yaw of the rotorcraft is required since coaxial rotor system 400 is rotationally isolated from fuselage 404. In yet other embodiments, either or both of top or bottom rotor assemblies 406, 408 may include a conventional swashplate-based collective blade pitch mechanism in lieu of, or in addition to, collective control pitch assembly 426.

Figure 7:
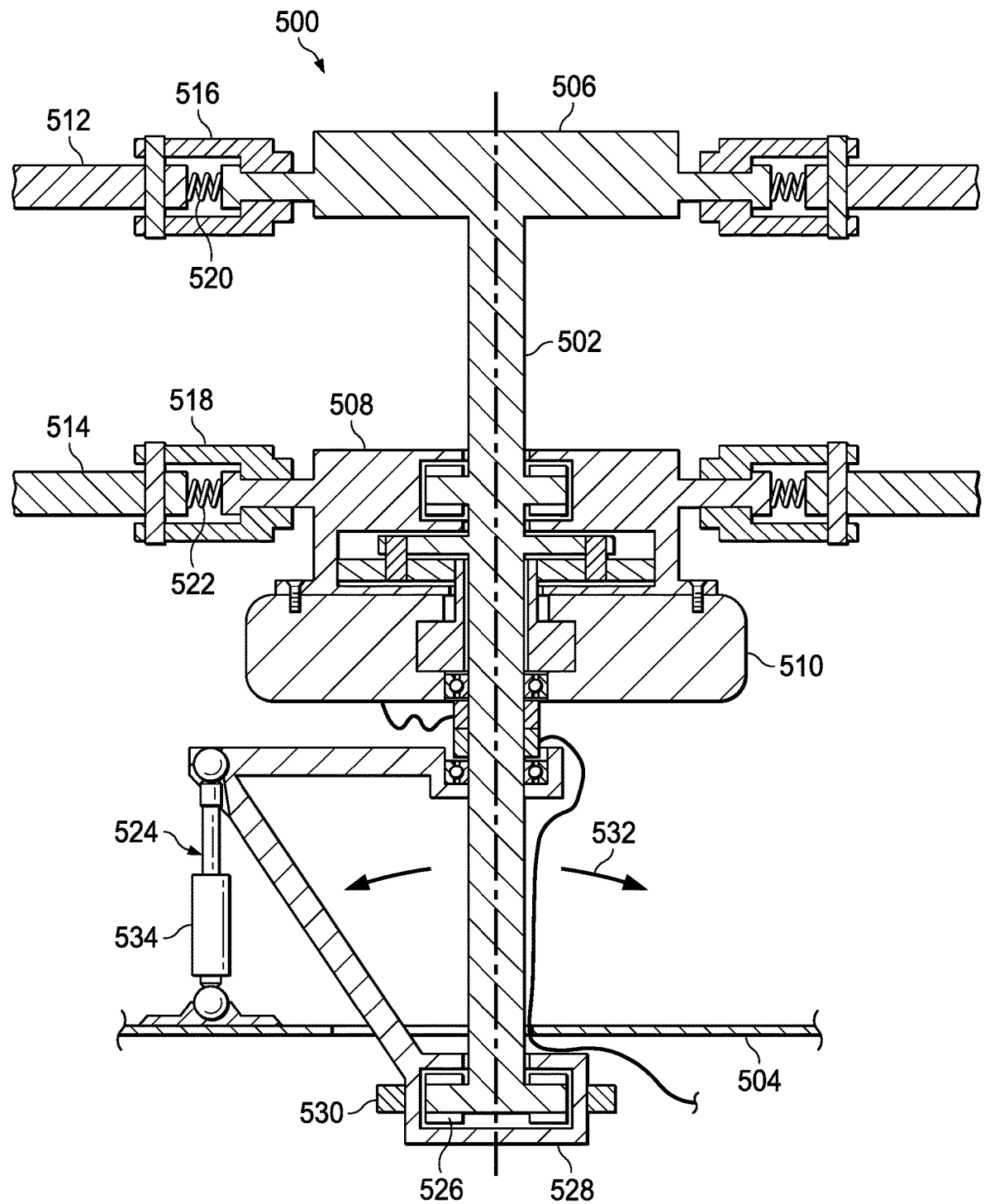
FIG. 7 is a cross-sectional view of a coaxial rotor system in accordance with embodiments of the present disclosure.

Referring to FIG. 7 in the drawings, a coaxial rotor system for a rotorcraft is schematically illustrated and generally designated 500. Mast 502 is rotatably coupled to fuselage 504 and supports top and bottom rotor assemblies 506, 508. Bottom rotor assembly 508 includes motor 510 to provide rotational energy to mast 502 to rotate top rotor assembly 506. Bottom rotor assembly 508 experiences a torque reaction force when motor 510 rotates mast 502 such that top and bottom rotor assemblies 506, 508 counter rotate. Top and bottom rotor assemblies 506, 508 include spring-loaded rotor blades 512, 514, which have manually adjustable pitches. Rotor blades 512, 514 are spring loaded onto yoke members 516, 518 via springs 520, 522. A push-turn-release mechanism allows an operator to optimize flight performance by manually adjusting the pitch of each rotor blade 512, 514 at selected points between hover and high speed forward flight regimes. For example, between flights or when grounded, the pilot may push, turn and release each rotor blade 512, 514 into a desired pitch position.

Coaxial rotor system 500 includes directional control assembly 524. The base of mast 502 is rotatably coupled to fuselage 504 via thrust bearing 526. The base of mast 502 and thrust bearing 526 are encased in casing 528, which is attached to fuselage 504 via gimbal attachment 530 including lugs that may protrude in orthogonal directions. Gimbal attachment 530 provides mast 502 with a gimballing degree of freedom 532 relative to fuselage 504 for both longitudinal and lateral directional control of the rotorcraft. Coaxial rotor system 500 is tiltable in gimballing degree of freedom 532 in both the longitudinal and lateral directions using one or more tilt actuators 534. Tilt actuators 534 may be spaced 90 degrees apart from one another about mast 502 to provide both longitudinal and lateral directional control.

Figure 8:
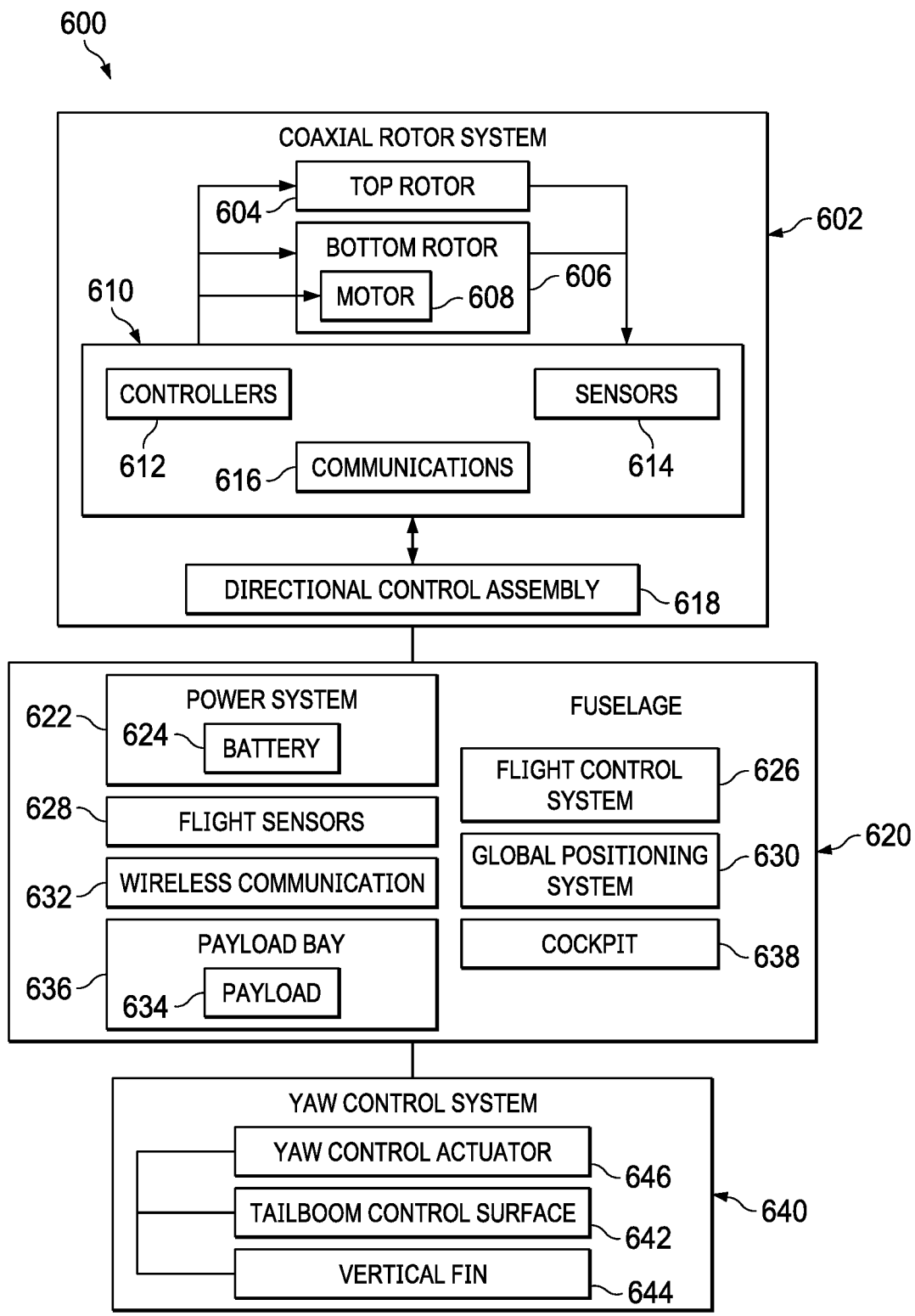
FIG. 8 is a block diagram of a propulsion and control system for a rotorcraft having a coaxial rotor system in accordance with embodiments of the present disclosure.

Referring to FIG. 8 in the drawings, a propulsion and control system for a rotorcraft such as rotorcraft 10 in FIGS. 1A-1B is schematically illustrated and generally designated 600. Coaxial rotor system 602 includes top and bottom rotor assemblies 604, 606. Bottom rotor assembly 606 includes electric motor 608. Electronics node 610 includes, for example, controllers 612, sensors 614 and communications elements 616 as well as other components suitable for use in the operation of coaxial rotor system 602. Each rotor assembly 604, 606 includes a plurality of rotor blades radiating therefrom. In some embodiments, coaxial rotor system 602 includes a collective control pitch assembly (not shown) to adjust the collective pitch of the rotor blades. Coaxial rotor system 602 includes a directional control assembly 618 for directional flight control of rotorcraft 600.

Fuselage 620 includes power system 622 that may serve as the electrical energy source for coaxial rotor system 602, including rotor assemblies 604, 606, motor 608 and electronics node 610. Power system 622 may include one or more batteries 624. Battery 624 may be charged by an electrical energy generation system (not shown), such as an internal combustion engine, or may be charged at a ground station. Battery 624 may also be interchangeably removed and installed to enable efficient refueling which may be particularly beneficial in embodiments of rotorcraft 600 wherein the sole electrical energy source is battery 624. In embodiments that include an electrical energy generation system such as an internal combustion engine housed within fuselage 620, the electrical energy generation system may include one or more fuel tanks such as liquid fuel tanks. In one non-limiting example, an internal combustion engine may be used to drive an electric generator that produces electrical energy that is fed to coaxial rotor system 602 to power rotor assemblies 604, 606, motor 608 and electronics node 610. In other embodiments, rotorcraft 600 may implement a hybrid power system including both an internal combustion engine and batteries. This type of hybrid power system may be beneficial in that the energy density of liquid fuel exceeds that of batteries enabling greater endurance for rotorcraft 600. In the hybrid power system, battery 624 may provide a backup electrical power source to enable rotorcraft 600 to safely land in the event of a failure of the internal combustion engine. In yet other embodiments, coaxial rotor system 602 may include a battery to provide backup battery power in the event of a failure of power system 622. As another alternative, coaxial rotor system 602 may be hydraulically driven within a hydraulic fluid system wherein one or more high pressure hydraulic sources or generators are housed within fuselage 620 to provide hydraulic power to coaxial rotor system 602.

In the illustrated embodiment, rotorcraft 600 includes a flight control system 626 housed within fuselage 620. Flight control system 626, such as a digital flight control system, may preferably be a redundant flight control system and more preferably a triply redundant flight control system including three independent flight control computers. Use of triply redundant flight control system 626 improves the overall safety and reliability of rotorcraft 600 in the event of a failure of flight control system 626. Flight control system 626 preferably includes non-transitory computer readable storage media including a set of computer instructions executable by one or more processors for controlling the operation of coaxial rotor system 602. Flight control system 626 may be implemented on one or more general purpose computers, special purpose computers or other machines with memory or processing capability. For example, flight control system 626 may include one or more memory storage modules including, but not limited to, internal storage memory such as random access memory, non-volatile memory such as read only memory, removable memory such as magnetic storage memory, optical storage, solid-state storage memory or other suitable memory storage. Flight control system 626 may be a microprocessor-based system operable to execute program code in the form of machine executable instructions. In addition, flight control system 626 may be selectively connectable to other computer systems via a proprietary encrypted network, a public encrypted network, the Internet or other suitable communication network that may include both wired and wireless connections.

Flight control system 626 communicates via a wired and/or wireless communications network with electronics node 610 of coaxial rotor system 602. In some embodiments, electronics node 610 may instead be centralized into fuselage 620. Flight control system 626 receives sensor data from and sends flight command information to electronics node 610 such that coaxial rotor system 602 may be controlled and operated. Flight control system 626 is configured to receive inputs from flight sensors 628 such as, but not limited to, gyroscopes, accelerometers or any other suitable sensing equipment configured to provide flight control system 626 with spatial, positional or force dynamics information, feedback or other data that may be utilized to manage the operation of rotorcraft 600. For example, flight control system 626 may use sensor data from flight sensors 628 to generate and send flight command information to electronics node 610 to control coaxial rotor system 602. Rotorcraft 600 may include global positioning system 630 configured to determine, receive and/or provide data related to the location of rotorcraft 600 including flight destinations, targets, no-fly zones, preplanned routes, flight paths or any other geospatial location-related information. Global positioning system 630 may be configured for bidirectional communication with flight control system 626, unidirectional communication from global positioning system 630 to flight control system 626 or unidirectional communication from flight control system 626 to global positioning system 630.

Rotorcraft 600 may include wireless communication components 632 such as radio communication equipment configured to send and receive signals related to flight commands or other operational information. Wireless communication components 632 may be configured to transmit video, audio or other data gathered, observed or otherwise generated, carried by or obtained by rotorcraft 600. In some embodiments, flight control system 626 may also be operable to communicate with one or more remote systems via wireless communication components 632 using a wireless communications protocol. The remote systems may be operable to receive flight data from and provide commands to flight control system 626 to enable flight control over some or all aspects of flight operation. In other embodiments, rotorcraft 600 may instead be a manned or piloted vehicle. In both manned and unmanned missions, flight control system 626 may autonomously control some or all aspects of flight operation.

Payload 634 is receivable by payload bay 636 and may include a video camera, thermal camera, infrared imaging device, high definition camera, weapon, chemical sensor, cargo, personal belongings such as luggage or any other suitable payload. Payload 634 may be configured to provide data to flight control system 626 and flight control system 626 may be configured to control, manipulate or release payload 634. In piloted implementations, one or more pilots may operate rotorcraft 600 from within cockpit 638. Yaw control system 640 extends aft of fuselage 620 and includes tailboom control surface 642 and vertical fin 644. Tailboom control surface 642 and vertical fin 644 may be synchronously or independently actuated by yaw control actuator 646. Power system 622 provides power to yaw control actuator 646.

Figure 9:
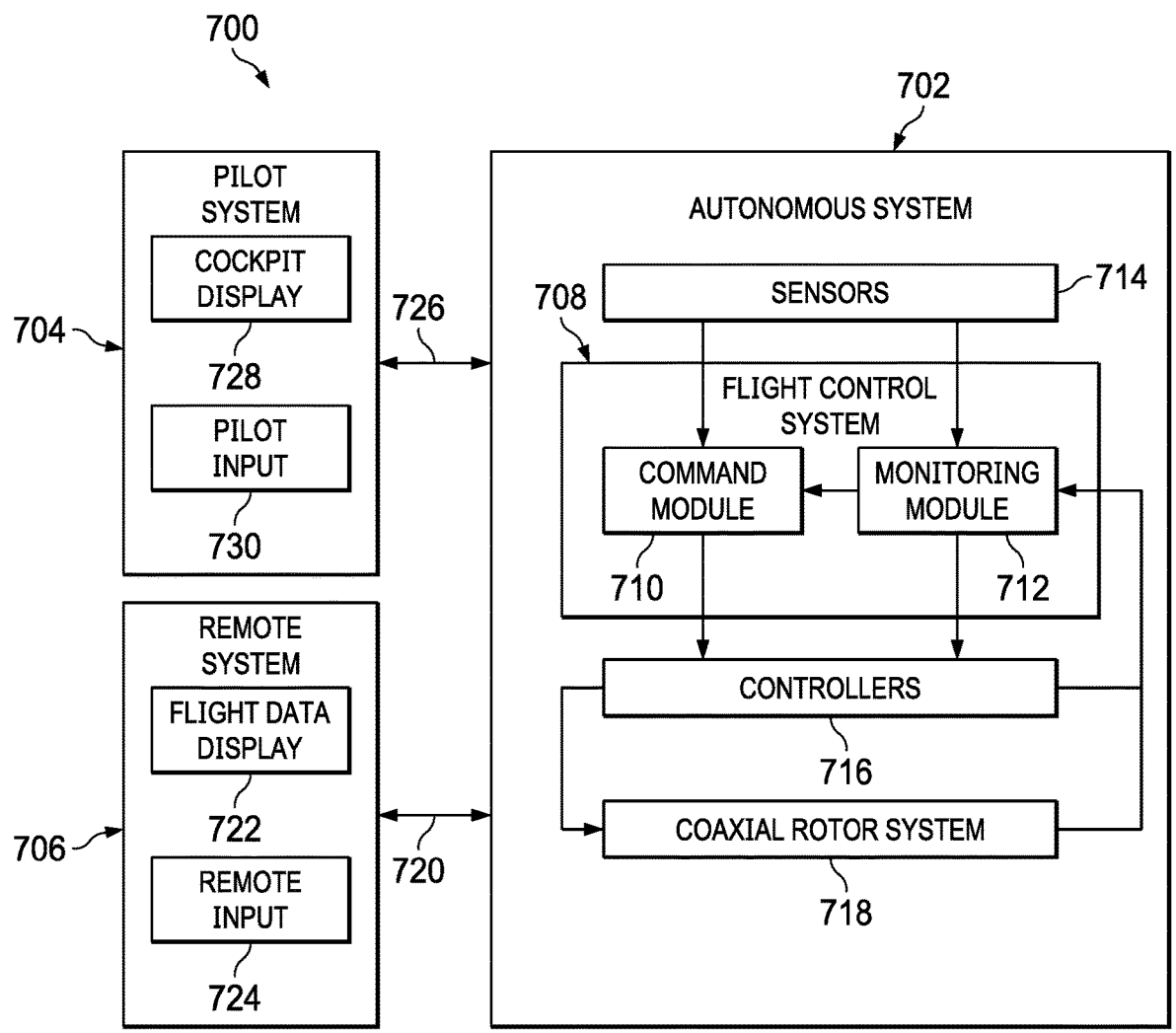
FIG. 9 is a block diagram of a control system for a rotorcraft having a coaxial rotor system in accordance with embodiments of the present disclosure.

Referring to FIG. 9 in the drawings, a block diagram depicts an aircraft control system 700 operable for use with rotorcraft 10 of FIGS. 1A-1B or any other aircraft of the illustrative embodiments. In the illustrated embodiment, system 700 includes three primary computer based subsystems; namely, an autonomous system 702, a pilot system 704 and a remote system 706. As discussed herein, the rotorcraft of the present disclosure may be operated autonomously responsive to commands generated by flight control system 708 that preferably includes a non-transitory computer readable storage medium including a set of computer instructions executable by a processor. Flight control system 708 may be a triply redundant system implemented on one or more general purpose computers, special purpose computers or other machines with memory and processing capability. For example, flight control system 708 may include one or more memory storage modules including, but is not limited to, internal storage memory such as random access memory, non-volatile memory such as read only memory, removable memory such as magnetic storage memory, optical storage, solid-state storage memory or other suitable memory storage. Flight control system 708 may be a microprocessor-based system operable to execute program code in the form of machine-executable instructions. In addition, flight control system 708 may be selectively connectable to other computer systems via a proprietary encrypted network, a public encrypted network, the Internet or other suitable communication network that may include both wired and wireless connections.

In the illustrated embodiment, flight control system 708 includes a command module 710 and a monitoring module 712. It is to be understood by those skilled in the art that these and other modules executed by flight control system 708 may be implemented in a variety of forms including hardware, software, firmware, special purpose processors and combinations thereof. Flight control system 708 receives input from a variety of sources including internal sources such as sensors 714, controllers 716, coaxial rotor system 718 and pilot system 704 as well as external sources such as remote system 706, global positioning system satellites or other location positioning systems and the like. For example, flight control system 708 may receive a flight plan including starting and ending locations for a mission from pilot system 704 and/or remote system 706. Thereafter, flight control system 708 is operable to autonomously control all aspects of flight of an aircraft of the present disclosure.

During the various operating modes of rotorcraft 700, command module 710 provides commands to controllers 716. These commands enable operation of coaxial rotor system 718 including, for example, controlling the rotational speed of the rotors, adjusting directional control, adjusting the thrust vectors and the like. Flight control system 708 receives feedback from controllers 716 and coaxial rotor system 718. This feedback is processed by monitoring module 712 that can supply correction data and other information to command module 710 and/or controllers 716. Sensors 714, such as positioning sensors, attitude sensors, speed sensors, environmental sensors, fuel sensors, temperature sensors, location sensors and the like also provide information to flight control system 708 to further enhance autonomous control capabilities.

Some or all of the autonomous control capability of flight control system 708 can be augmented or supplanted by a remote flight control system 706. Remote system 706 may include one or computing systems that may be implemented on general purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet or any other type of network that couples a plurality of computers to enable various modes of communication via network messages using suitable communication techniques such as transmission control protocol/internet protocol, file transfer protocol, hypertext transfer protocol, internet protocol security protocol, point-to-point tunneling protocol, secure sockets layer protocol or other suitable protocol. Remote system 706 communicates with flight control system 708 via a communication link 720 that may include both wired and wireless connections.

Remote system 706 preferably includes one or more flight data display devices 722 configured to display information relating to one or more aircraft of the present disclosure. Display devices 722 may be configured in any suitable form, including, for example, liquid crystal displays, light emitting diode displays, cathode ray tube displays or any suitable type of display. Remote system 706 may also include audio output and input devices such as a microphone, speakers and/or an audio port allowing an operator to verbally communicate with, for example, a pilot on board rotorcraft 700. Display devices 722 may also serve as a remote input device 724 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 704. Pilot system 704 may be integrated with autonomous system 702 or may be a standalone system preferably including a non-transitory computer readable storage medium including a set of computer instructions executable by a processor and may be implemented by a general purpose computer, a special purpose computer or other machine with memory and processing capability. Pilot system 704 may include one or more memory storage modules including, but not limited to, internal storage memory such as random access memory, non-volatile memory such as read only memory, removable memory such as magnetic storage memory, optical storage memory, solid-state storage memory or other suitable memory storage. Pilot system 704 may be a microprocessor-based system operable to execute program code in the form of machine-executable instructions. In addition, pilot system 704 may be connectable to other computer systems via a proprietary encrypted network, a public encrypted network, the Internet or other suitable communication network that may include both wired and wireless connections. Pilot system 704 may communicate with flight control system 708 via a communication channel 726 that preferably includes a wired connection.

Pilot system 704 preferably includes a cockpit display device 728 configured to display information to an onboard pilot. Cockpit display device 728 may be configured in any suitable form, including, for example, as one or more display screens such as liquid crystal displays, light emitting diode displays and the like or any other suitable display type including, for example, a display panel, a dashboard display, an augmented reality display or the like. Pilot system 704 may also include audio output and input devices such as a microphone, speakers and/or an audio port allowing an onboard pilot to verbally communicate with, for example, air traffic control or an operator of a remote system. Cockpit display device 728 may also serve as a pilot input device 730 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinary skill in the art, through the use of system 700, an aircraft of the present disclosure can be operated responsive to a flight control protocol including autonomous flight control, remote flight control or onboard pilot flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A coaxial rotor system for a rotorcraft comprising:
a mast;
a top rotor assembly coupled to a distal end of the mast, the top rotor assembly including a plurality of variable pitch rotor blades;
a bottom rotor assembly including a plurality of variable pitch rotor blades and a motor configured to provide rotational energy to the mast, thereby rotating the top rotor assembly; and
a collective control pitch assembly disposed between the top and bottom rotor assemblies, the collective control pitch assembly including a translational sleeve configured to rotate with the mast, a plurality of pitch arms interposed between the translational sleeve and the rotor blades, a limiter base rotatably coupled to an underside of the translational sleeve and a spring interposed between the limiter base and the bottom rotor assembly configured to bias the translational sleeve toward the top rotor assembly, the collective control pitch assembly configured to vary collective pitch of the rotor blades responsive to rotation of the mast;
wherein the bottom rotor assembly experiences a torque reaction force responsive to the motor rotating the mast such that the top and bottom rotor assemblies counter rotate.

2. The coaxial rotor system as recited in claim 1 wherein the mast forms a mast plate disposed in the bottom rotor assembly, the bottom rotor assembly rotatably coupled to the mast plate via a thrust bearing.

3. The coaxial rotor system as recited in claim 1 wherein the bottom rotor assembly further comprises a bottom rotor hub, the motor coupled to an underside of the bottom rotor hub.

4. The coaxial rotor system as recited in claim 1 wherein the motor is rotatably coupled to the mast via a bearing.

5. The coaxial rotor system as recited in claim 1 wherein the mast further comprises an upper mast hingeably coupled to a mast base, further comprising a directional control assembly configured to longitudinally and laterally tilt the upper mast relative to the mast base.

6. The coaxial rotor system as recited in claim 5 wherein the upper mast is hingeably coupled to the mast base via a cardan joint.

7. The coaxial rotor system as recited in claim 5 wherein the directional control assembly further comprises a rotor tilting subassembly including a horizontal arm coupled to the upper mast and a vertical arm including a tilt actuator coupled to the horizontal arm, the tilt actuator configured to tilt the upper mast via the horizontal arm.

8. The coaxial rotor system as recited in claim 7 wherein the rotor tilting subassembly further comprises a longitudinal rotor tilting subassembly and a lateral rotor tilting subassembly spaced approximately 90 degrees from the longitudinal rotor tilting subassembly about the mast.

9. The coaxial rotor system as recited in claim 1 wherein the collective control pitch assembly further comprises an adjustable collective limiter interposed between the limiter base and the bottom rotor assembly configured to limit downward translation of the translational sleeve to control maximum collective pitch of the rotor blades.

10. The coaxial rotor system as recited in claim 1 wherein distal ends of the pitch arms are coupled to trailing ends of the rotor blades and proximal ends of the pitch arms are rotatably coupled to the translational sleeve.

11. The coaxial rotor system as recited in claim 1 wherein the pitch arms further comprise a plurality of upper pitch arms interposed between the translational sleeve and the rotor blades of the top rotor assembly and a plurality of lower pitch arms interposed between the translational sleeve and the rotor blades of the bottom rotor assembly.

12. The coaxial rotor system as recited in claim 1 wherein the mast further comprises one or more splines and the translational sleeve forms one or more spline grooves to receive the one or more splines, the translational sleeve translating along the one or more splines, the one or more splines constraining rotation of the translational sleeve relative to the mast.

13. The coaxial rotor system as recited in claim 1 wherein the mast is rotatably coupled to the top rotor assembly up to a predetermined number of revolutions via a thrust bearing;
wherein the translational sleeve forms a ball screw nut cavity having internal threads;
wherein the collective control pitch assembly further comprises a ball screw having external threads complementary to the internal threads of the ball screw nut cavity, the ball screw coupled to the top rotor assembly; and
wherein the translational sleeve translates downward and the ball screw translates out of the ball screw nut cavity responsive to relative rotation between the mast and the top rotor assembly.

14. An aircraft comprising:
a fuselage;
a mast rotatably coupled to the fuselage;
a top rotor assembly coupled to a distal end of the mast, the top rotor assembly including a plurality of variable pitch rotor blades;
a bottom rotor assembly including a plurality of variable pitch rotor blades and a motor configured to provide rotational energy to the mast, thereby rotating the top rotor assembly; and
a collective control pitch assembly disposed between the top and bottom rotor assemblies, the collective control pitch assembly including a translational sleeve configured to rotate with the mast, a plurality of pitch arms interposed between the translational sleeve and the rotor blades, a limiter base rotatably coupled to an underside of the translational sleeve and a spring interposed between the limiter base and the bottom rotor assembly configured to bias the translational sleeve toward the top rotor assembly, the collective control pitch assembly configured to vary collective pitch of the rotor blades responsive to rotation of the mast;
wherein the bottom rotor assembly experiences a torque reaction force responsive to the motor rotating the mast such that the top and bottom rotor assemblies counter rotate.

15. The aircraft as recited in claim 14 wherein a base of the mast is rotatably coupled to the fuselage via a thrust bearing.

16. The aircraft as recited in claim 14 further comprising a yaw control system including a tailboom control surface rotatably coupled to an aft end of the fuselage and a vertical fin rotatably coupled to an aft end of the tailboom control surface.

17. The aircraft as recited in claim 16 wherein the yaw control system further comprises a yaw control actuator configured to synchronously rotate the tailboom control surface and the vertical fin.

* * * * *